Oct. 24, 1961 E. F. WEBB 3,005,222
WINDSHIELD CLEARING SYSTEM
Filed May 7, 1958

INVENTOR.
EDMOND F. WEBB
BY Sewell & Henderson
ATTORNEY

3,005,222
WINDSHIELD CLEARING SYSTEM
Edmond F. Webb, Franklin, Mich., assignor to The Delman Company, Cookeville, Tenn., a corporation of Tennessee
Filed May 7, 1958, Ser. No. 733,508
3 Claims. (Cl. 15—250.02)

This invention relates generally to vehicle windshield clearing systems and more particularly to a system providing for the concurrent operation of a wiper unit and a washer unit.

An object of this invention is to provide a fluid pressure arrangement for simultaneous actuation of a windshield wiper unit and a windshield washer unit.

Another object of this invention is to provide a vehicle windshield clearing system wherein an actuating unit for a wiper unit and a pump unit for a washer unit are operated simultaneously from a common fluid pressure arrangement.

A further object of this invention is to provide a fluid pressure arrangement for simultaneous operation of a windshield wiper unit and a windshield washer unit and for a delayed operation of the wiper unit relative to the washer unit.

It is another object of this invention to provide an air pressure arrangement and a manual control therefor for simultaneous operation of a fluid-type washer unit and a conventional wiper motor.

Yet another object of this invention is to provide a system capable of attaining the aforementioned objects which is economical to manufacture, simple to install, easy to maintain, and effective in service.

These and other objects will become readily apparent by reference to the following description when taken into account with the accompanying drawing, wherein.

Figure 1:
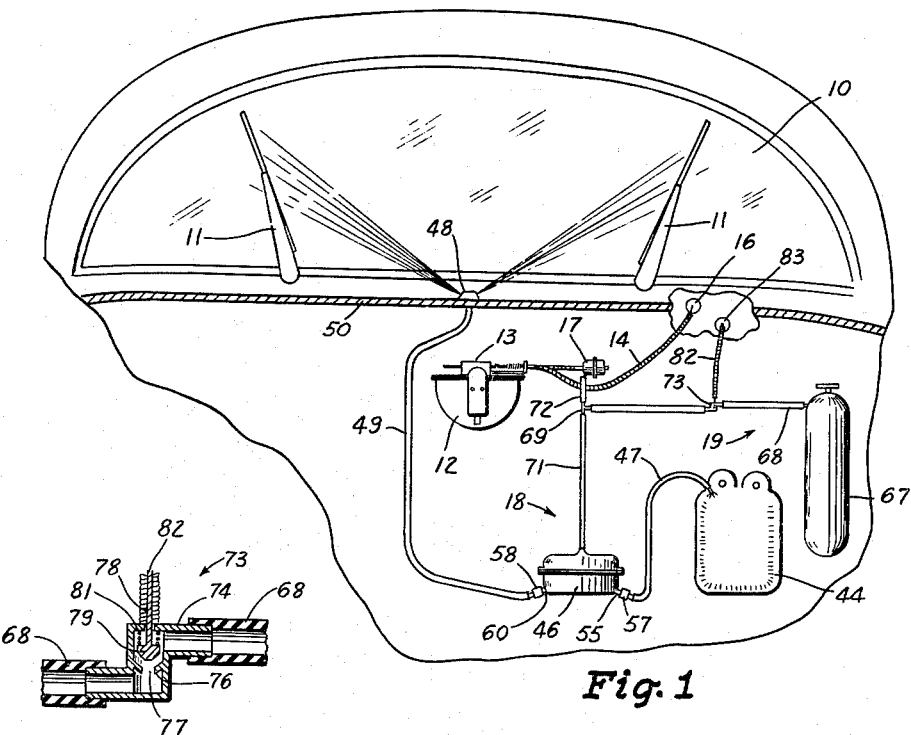
FIG. 1 is a fragmentary front view of a vehicle, partly in section, and showing in elevation the components of the invention in assembled relation.

Referring now to the drawing, a vehicle is shown in FIG. 1 having a windshield 10 and conventional wipers 11 therefor, with the wipers being operated by a wiper motor 12 through a usual linkage (not shown). A control valve device 13 is associated with the wiper motor 12 and may be actuated through a Bowden wire 14 by a manual control knob 16 mounted on the dash panel (not shown).

The system with which the invention is concerned includes: an actuating unit 17 for operating the control valve device 13; a washer unit, indicated generally at 18, for discharging fluid against the windshield and in the path of the wipers 11; and a fluid pressure unit, indicated generally at 19, for controlling the operation of the actuating unit 17 and the washer unit 18.

The actuating unit 17 (FIG. 3) comprises an elongated circular casing 21 including a pair of sections 22 and 23 joined in a fluid tight manner at 24. An opening 26 is formed in an outwardly extended seat portion 36 of the section 23 and another opening 27 is formed in an outwardly extended bore portion 43 of the section 22, the openings 26 and 27 being in axial alignment. A hose fitting 28 is formed in a side wall of the section 22 at a convenient location.

An extensible, circular diaphragm 29 is secured about its periphery at the junction 24 of the sections 22 and 23 so as to divide the casing 21 into a pair of chambers 31 and 33, respectively. A coil spring 34 extends along the longitudinal axis of the casing 21, one end of the spring being seated in the portion 36 and the other end being seated on a backing member 37 secured to the diaphragm 29. An actuating wire 38 extends axially through the casing 21 and through the center of the diaphragm 29 to which it is secured. One end 39 of the wire 38 passes through the rear opening 26, an enlarged intermediate portion 40 formed intermediate the length of the wide 38 is extended through the bore portion 43, and the other end 41 of the wire extends toward and is in operative engagement with the control valve device 13 of the wiper motor 12 in a manner hereinafter described. The end 40a of the enlarged wire portion 40 has a smooth surface whereas its end 40b has a plurality of angularly spaced, longitudinally extended grooves 42 formed on the surface thereof for a purpose to appear hereinafter.

The washer unit 18 (FIG. 1) comprises a flexible bag-type reservoir 44, a pump unit 46 connected to the reservoir 44 by a fluid transmitting line 47, and a nozzle device 48 mounted on the cowl 50 of the vehicle for discharging fluid onto the windshield 11, the nozzle device 48 being fluid connected to the pump unit 46 by a line 49. The pump unit 46 (FIG. 4) is comprised of a circular housing 51 including an upper section 52 and a lower section 53 joined in a fluid-tight manner at 54. The upper section 52 is provided with a hose connection 56 formed in the wall thereof at a convenient location. The lower section 53 is provided with an inlet 55 and an outlet 60 provided with conventional ball check valve devices 57 and 58, respectively, attached thereto. The valve device 57 is arranged to permit only the entry of fluid into the housing 51, and the valve device 58 is arranged to permit only the emission of fluid from the housing 51.

A circular flexible diaphragm 59 (FIG. 4) is secured about its periphery in the junction 54 and divides the housing 51 into two chambers 64 and 66, the upper chamber 64 thus including the hose connection 56 and the lower chamber 66 including the inlet 55 and outlet 60. A coil spring 61 is arranged between the bottom 62 of the lower section 53 and a backing element 63 secured to the center of the diaphragm 59 whereby to bias the diaphragm toward the upper chamber 64. By attaching the line 47 from the reservoir 44 to the valve device 57 and the line 49 from the nozzle 48 to the valve device 58, the chamber 66 is fluid connected between the reservoir 44 and the nozzle device 48.

Figure 3:
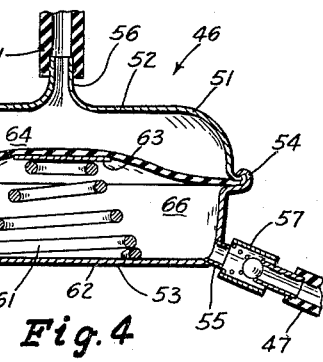
FIG. 3 is an enlarged longitudinal sectional detail view of the wiper motor actuating unit of FIG. 1.

The fluid pressure unit 19 includes a container 67 (FIG. 1) adapted to hold a fluid, such as air, under pressure therewithin. A supply line 68 leads from the container 67 to a T-fitting 69. From the fitting 69, a fluid pressure transmitting line 71 leads to the hose connection 56 of the pump 46 (FIG. 4), and another line 72 leads to the hose connection 28 of the actuator unit casing 21 (FIG. 3). By this arrangement, the chamber 31 of the actuator unit 17 and the upper chamber 64 of the pump unit are fluid connected with the container 67 and subject to the air pressure therein.

Figure 2:
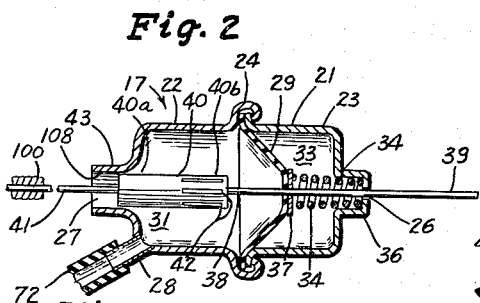
FIG. 2 is an enlarged longitudinal sectional detail view of the control valve unit of FIG. 1.

To regulate the supply of air pressure to these chambers, 31 and 64 respectively, a control valve device 73 (FIGS. 1 and 2) is connected in the supply line 68. The valve device 73 includes a housing 74 open at each end for fluid connection in the supply line 68. Intermediate the open ends of the housing 74, is a V-shaped valve seat 76 having an apex opening 77. The passage of air under pressure through the opening 77 from the container 67 is controlled by a valve 78 inserted through a fluid-tight opening provided therefor in a wall of the housing 74 and having a valve head 79 adapted to seat on the valve seat 76. A spring 81 is mounted about the valve 78 to bias the valve head 79 into a normally seated position, whereby the valve device 73 is normally closed to the passage of air therethrough. To actuate the valve device 73, a Bowden wire unit 82 is attached to the valve 78 and connected to a control knob 83 (FIG. 1) mounted on the dash panel (not shown) of the vehicle.

Figure 5:
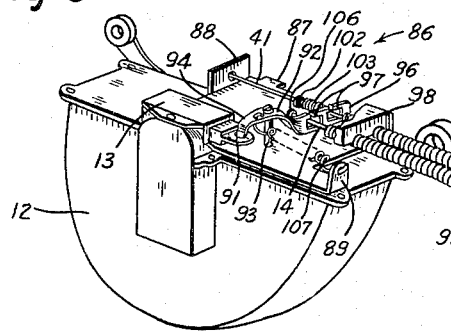
FIG. 5 is an enlarged, perspective view of the control arrangement of the actuating unit for the wiper motor unit with certain parts being broken away for the purpose of clarity.

Referring now particularly to FIG. 5, a wiper motor control, indicated generally at 86, is disclosed for providing actuation of the motor control device 13 by either the control knob 16 or the valve control knobs 83 (FIG. 1).

The control device 86 includes a bracket 87 secured to the motor 12, and having an upwardly extended guide flange 88 at one end and an ear portion 89 at the other end, with the portion 89 being substantially in line with the path of movement of a slide member 91 for the control valve device 13. A lever member 92 is pivotally mounted on a pin 93 secured to the bracket 87. The lever member 92 is twisted so that one end 94 is inserted in an opening provided therefor in the slide member 91 and the other end 96 extends in a plane perpendicular to the surface of the bracket 87, the end 96 having a pair of slots 97 formed therein. A Bowden wire clamping unit 98 is secured to the bracket 87 opposite the guide flange 88, and has secured therein a casing 99 for the wire 14 from the control knob 16, and a casing 100 for the wire 41 from the actuator unit 17.

The Bowden wire 41 extends through one slot 97 and through an opening provided therefor in the guide flange 88, and has a bead 102 secured thereto between the flange 88 and the lever 92, with a spring 103 being secured about the wire 41 between the bead 102 and the lever 92. The wire 14 extends through the other slot 97 and has a bead 106 formed at the end thereof. A biasing spring 107 is secured between the ear portion 89 and a portion of the lever member 92 adjacent its end 94. Under the influence of the biasing spring 107, the normal position of the slide member 91 of the control valve device 13 is thus in a protruded position, i.e., the reverse of its position shown in FIG. 5.

Due to the arrangement of the wiper motor control 86, the wiper motor 12 may be actuated independently of or concurrently with operation of the washer unit 18.

Thus by pulling or otherwise operating the control knob 16, the Bowden wire 14 is moved so that the bead 106 contacts the lever 92 to rotate the lever in a clockwise manner as viewed in FIG. 5 against the tension of the biasing spring 107. This movement results in the control member 91 being moved inwardly of the control valve device 13 as shown in FIG. 5 to actuate the wiper motor 12. The clockwise movement of the lever 92 does not, however, affect the Bowden wire 41 of the actuator unit 17 as the lever 92 is free at the slot 97 to move away from the bead 102 on the wire 41.

To place the wiper and washer units into concurrent operation, the valve control knob 83 is pulled or otherwise actuated whereby the valve head 79 is lifted off the seat 76 against the compression of the spring 81. Thus the air under pressure is permitted to flow from the container 67 through the line 68 and the opening 77 in the control valve device 73 to the T-fitting 69. From the fitting 69, the air under pressure is transmitted through the line 72 to the chamber 31 of the actuating unit 17. The pressure in the chamber 31 forces the diaphragm 29 into the chamber 33 as indicated in FIG. 3 to move the actuating wire 38 toward the right, as also viewed in FIG. 3. This action moves the bead 102 (FIG. 5) of the wire 41 against the lever 92, as cushioned by the spring 103, whereby to rotate the lever 92 in a clockwise manner as viewed in FIG. 5. Such movement of the lever 92 moves the valve slide member 91 inwardly of the valve device 13 to start the wiper motor 12.

Figure 4:
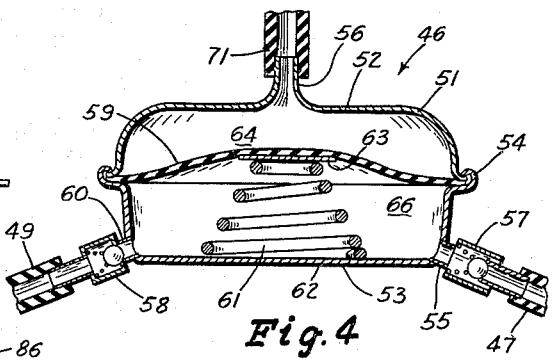
FIG. 4 is an enlarged vertical sectional view of the pump unit of FIG. 1.

Concurrently with the transmission of air under pressure through the line 72 to the actuating unit 17, air is also transmitted through the line 71 to the upper chamber 64 of the pump unit 46 (FIG. 4). A build up of pressure in the upper or air chamber 64 forces the diaphragm 59 downwardly and into the lower fluid chamber 66. Thus, the fluid in the lower chamber 66, being unable to escape through the inlet 55, is emitted through the outlet 60 and into the fluid transmitting line 49 from whence it is forced through the nozzle device 48 and onto the windshield 10.

A release of the valve control knob 83 results in the valve head 79 (FIG. 2) being seated in the seat 76 of the valve housing 74 whereby to stop the flow of air under pressure from the container 67. Thus as the air is cut off to the respective chambers 31 and 64 of the actuating unit 17 and the pump unit 46, the respective diaphragms in each of those units tend to return to their normal positions. It may be noted in the pump unit 46, that as the diaphragm 59 moves upwardly due to the biasing of the spring 61, fluid from the reservoir 44 is drawn into the lower chamber 66 through the inlet 55, the valve device 58 in the outlet 60 being closed during this fluid intake action of the pump.

It is desirable for the purpose of removing all fluid discharged on the windshield 10 from the nozzle 48 that the wipers 11 be maintained in operation for a short period after the termination of operation of the pump 46. This is accomplished by delaying the action of the lever member 92 is moving the slide member 91 to turn off the wiper motor 12.

Thus when the control valve 78 is closed, the operation of the washer is stopped by the action of the check valve 58. However, the wiper 12 continues in operation by virtue of an air bleed arrangement provided in the actuator unit 17 (FIG. 3). Thus on the admission of air under pressure to the chamber 31, and the movement of the diaphragm 29 into the chamber 33, the biasing spring 34 was placed under compression to its position shown in FIG. 3. On cutting off the supply of air to the chamber 31, at the valve 78, the spring 34 forces the diaphragm 29 and the attached actuating wire 38 to the left as also viewed in FIG. 3. The air trapped in the chamber 31, the lines 72, 71 and the air pump chamber 64, is permitted to escape only through the clearance area between the outer smooth surface of the end 40a of the enlarged portion 40 and the inner peripheral surface 108 of the bore section 43. However, as the portion 40 moves toward the left, this area is increased by virtue of the grooves 42 formed at the end 40b of the portion 40. Thus, a sequential slow-fast air bleed occurs, i.e., an initial slow bleed to delay the action of the slide member 91 in stopping the wiper motor 12, and a final fast bleed to assure a quick positive movement of the member 91 to its position for stopping the motor 12. Air under atmospheric pressure is permitted to enter the chamber 33 of the actuator casing between the end 39 of the wire 38 and the opening 26.

Of importance, the provision in the actuating unit 17 of a fast air bleed at the end of the movement of the actuating wire 38, whereby the wiper motor 12 is quickly turned off, also provides an equally fast return of the diaphragm 59 in the pump unit 46 to its normal position. Thus, concurrently with a stopping of the wiper motor operation, the pump unit 46 is in a re-charged position poised and ready for the next fluid discharge cycle.

It may be noted that the container 67 may be provided in various forms providing for a replenishable supply of air under pressure. The container 67 may be a spare tire, a container having a tire valve for filling purposes, it may be connected to a motor driven air compressor, and it may be a container adapted for filling by air Freon or carbon dioxide cartridges.

From the above description it can be seen that the windshield clearing system of this invention provides for the operation of the windshield wipers 11 either independently of or in conjunction with the washer unit 17 depending on driving conditions. Further, it may be seen that upon a release of the valve control knob 83 whereby to shut off air pressure from the container 67, the wiper motor 12 continues to operate for a short interval of time beyond the ceasing of operation of the washer unit 18, due to the slow-fast air bleed arrangement of the actuating unit 17. Additionally, immediately upon the stopping of the wiper motor, the pump unit is re-charged and in position to repeat the cycle.

Although the invention has been described with respect to a preferred embodiment, it is to be understood that various changes can be made therein which are within the full intended scope of this invention as defined by the appended claims.

I claim:

1. A vehicle windshield cleaning system for vehicles comprising a suction operated wiper motor and a control valve therefor, a pneumatic actuating means including an inbuilt fluid bleed means, mechanical means to interconnect the actuating means with the control valve of the wiper motor, a washer unit including a nozzle, a pneumatically operated pump means, a reservoir of washing liquid, and interconnecting lines therefor, a source of fluid under a superatmospheric pressure having a supply line, fluid transmission means connecting said actuating means and said pump means with the supply line of said pressurized fluid source, and a manually actuated valve connected in the supply line of the source of pressurized fluid, said manually operable valve, when opened, directly connecting the pressurized fluid source to said actuating means to move the motor control valve through said mechanical means in one direction and to said pump means to actuate said means to supply liquid to the nozzle, said bleed means of the actuating means continuously bleeding pressurized fluid during an operation of the manual valve and providing thereby a time delay in the reverse movement of said mechanical means when said manual valve is closed.

2. A vehicle windshield cleaning system according to claim 1, wherein the bleed means provides for an initial slow reverse movement of the mechanical means followed by a faster final reverse movement thereof.

3. A vehicle windshield clearing system comprising a wiper motor and a control valve therefor, a fluid pressure operated actuating unit for said control having a housing and a working member within said housing operatively associated with said control valve, said working member being movable in one direction by fluid pressure to move said control valve to a motor operating position, spring means for returning said working member in an apposite direction to move said control valve to stop said motor, a washer unit including a nozzle and a fluid pressure operated pump means, a source of fluid pressure, fluid pressure transmission means connecting said source with said actuating unit and pump means, an operator actuated control unit in said transmission means for simultaneously controlling the admission of fluid pressure to said actuating unit and pump means, and a pressure relief means in said actuating unit in fluid connection with said transmission means and common to said actuating unit and pump means for deactuating said pump means and actuating unit after said control unit has been closed, said pressure relief means including an elongated valve member connected to said working member for movement therewith, said housing having an atmospheric opening therein for loosely receiving said elongated valve member, with said valve member having an end section formed with longitudinally extended grooves, said end section being movable inwardly of said housing and out of said opening on movement of the working member in said one direction, and extendable through said opening on movement of the working member in said opposite direction whereby the initial movement of said working member to move said control valve in a direction to stop said motor is at a rate slower than the final movement thereof.

References Cited in the file of this patent

UNITED STATES PATENTS

| | | |
|---|---|---|
| 2,622,261 | Smith | Dec. 23, 1952 |
| 2,769,194 | Oishei | Nov. 6, 1956 |
| 2,860,362 | Riester | Nov. 18, 1958 |
| 2,869,165 | Dermond | June 6, 1959 |
| 2,958,891 | Hart et al. | Nov. 8, 1960 |

FOREIGN PATENTS

| | | |
|---|---|---|
| 997,554 | France | Sept. 12, 1951 |
| 1,111,220 | France | Oct. 26, 1955 |